United States Patent
Someya

(10) Patent No.: US 10,870,199 B2
(45) Date of Patent: Dec. 22, 2020

(54) ROBOT SYSTEM AND ROBOT TEACHING METHOD

(71) Applicant: FANUC CORPORATION, Yamanashi (JP)

(72) Inventor: Makoto Someya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 15 days.

(21) Appl. No.: 16/003,773

(22) Filed: Jun. 8, 2018

(65) Prior Publication Data

US 2019/0015972 A1 Jan. 17, 2019

(30) Foreign Application Priority Data

Jul. 12, 2017 (JP) .................................. 2017-136149

(51) Int. Cl.
 B25J 9/00 (2006.01)
 B25J 9/16 (2006.01)
 B25J 13/08 (2006.01)

(52) U.S. Cl.
 CPC ........... B25J 9/0081 (2013.01); B25J 9/1694 (2013.01); B25J 13/085 (2013.01)

(58) Field of Classification Search
 CPC ...................................... B25J 9/00; B25J 9/16
 See application file for complete search history.

(56) References Cited

U.S. PATENT DOCUMENTS

| 6,385,508 B1* | 5/2002 | McGee | B25J 9/0081 |
| | | | 285/189 |
| 2004/0257021 A1 | 12/2004 | Chang et al. | |
| 2013/0343640 A1 | 12/2013 | Buehler et al. | |
| 2013/0345863 A1 | 12/2013 | Linder et al. | |
| 2013/0345869 A1 | 12/2013 | Chen et al. | |
| 2013/0345870 A1 | 12/2013 | Buehler et al. | |
| 2013/0345872 A1 | 12/2013 | Brooks et al. | |
| 2013/0345873 A1 | 12/2013 | Blumberg et al. | |
| 2013/0345874 A1 | 12/2013 | Blumberg et al. | |
| 2013/0345875 A1 | 12/2013 | Brooks et al. | |
| 2013/0346348 A1 | 12/2013 | Buehler et al. | |
| 2014/0201112 A1 | 7/2014 | Sawada et al. | |
| 2015/0081098 A1* | 3/2015 | Kogan | B25J 13/085 |
| | | | 700/258 |

(Continued)

FOREIGN PATENT DOCUMENTS

| CN | 103921265 A | 7/2014 |
| CN | 106444861 A | 2/2017 |

(Continued)

OTHER PUBLICATIONS

Japanese Office Action dated May 7, 2019, in connection with corresponding JP Application No. 2017-136149 (7 pgs., including English translation).

(Continued)

*Primary Examiner* — Kira Nguyen
(74) *Attorney, Agent, or Firm* — Maier & Maier, PLLC

(57) ABSTRACT

Provided is a robot system including a robot including at least one sensor that detects an applied external force and a controller that controls the robot. The controller changes an operation mode of the robot when performing lead-through teaching in accordance with a position and a pattern of the external force detected by the sensor.

10 Claims, 3 Drawing Sheets

(56) References Cited

U.S. PATENT DOCUMENTS

| | | | |
|---|---|---|---|
| 2015/0290802 A1 | 10/2015 | Buehler et al. | |
| 2015/0290803 A1 | 10/2015 | Buehler et al. | |
| 2016/0207197 A1* | 7/2016 | Takahashi | B25J 9/1676 |
| 2016/0243705 A1* | 8/2016 | Naitou | B25J 13/085 |
| 2017/0312917 A1* | 11/2017 | Chung | B25J 9/1664 |
| 2018/0361594 A1* | 12/2018 | Haddadin | G05B 19/423 |

FOREIGN PATENT DOCUMENTS

| | | |
|---|---|---|
| EP | 2 757 430 A2 | 7/2014 |
| JP | H03-136783 A | 6/1991 |
| JP | H11-254361 A | 9/1999 |
| JP | 2002-120183 A | 4/2002 |
| JP | 2004-283975 A | 10/2004 |
| JP | 2007-523757 A | 8/2007 |
| JP | 2008-200764 A | 9/2008 |
| JP | 2009-162599 A | 7/2009 |
| JP | 2009-297853 A | 12/2009 |
| JP | 2010-064672 A | 3/2010 |
| JP | 4962424 B2 | 6/2012 |
| JP | 2015-520040 A | 7/2015 |
| JP | 2016-153156 A | 8/2016 |
| JP | 2018-530449 A | 10/2018 |
| WO | 2004/114037 A2 | 12/2004 |
| WO | 2013/192490 A2 | 12/2013 |
| WO | 2017/060538 A1 | 4/2017 |

OTHER PUBLICATIONS

Japanese Search Report dated Apr. 22, 2019, in connection with corresponding JP Application No. 2017-136149 (23 pgs., including English translation).

Office Action dated Jul. 3, 2020 in corresponding Chinese Application No. 201810729801.X; 12 pages including English-language translation.

* cited by examiner

ROBOT SYSTEM AND ROBOT TEACHING METHOD

CROSS-REFERENCE TO RELATED APPLICATIONS

This application is based on Japanese Patent Application No. 2017-136149, the contents of which are incorporated herein by reference.

FIELD

The present invention relates to robot systems and robot teaching methods.

BACKGROUND

In a known system in which a robot is movable along a linear external shaft, an external force applied to the terminal end of the robot and the pattern of the external force are detected, and a control target to be controlled by direct teaching is switched between the robot and the linear external shaft (e.g., see the Publication of Japanese Patent No. 4962424).

SUMMARY

The present invention provides the following solutions.

An aspect of the present invention provides a robot system including a robot including at least one sensor that detects an applied external force, and a controller that controls the robot. The controller changes an operation mode of the robot when performing lead-through teaching in accordance with a position and a pattern of the external force detected by the sensor.

Another aspect of the present invention provides a robot teaching method including detecting a position and a pattern of an external force applied to a robot, and changing an operation mode of the robot when performing lead-through teaching in accordance with the detected position and pattern of the external force.

DETAILED DESCRIPTION

A robot system 1 and a robot teaching method according to an embodiment of the present invention will be described below with reference to the drawings.

Figure 1:
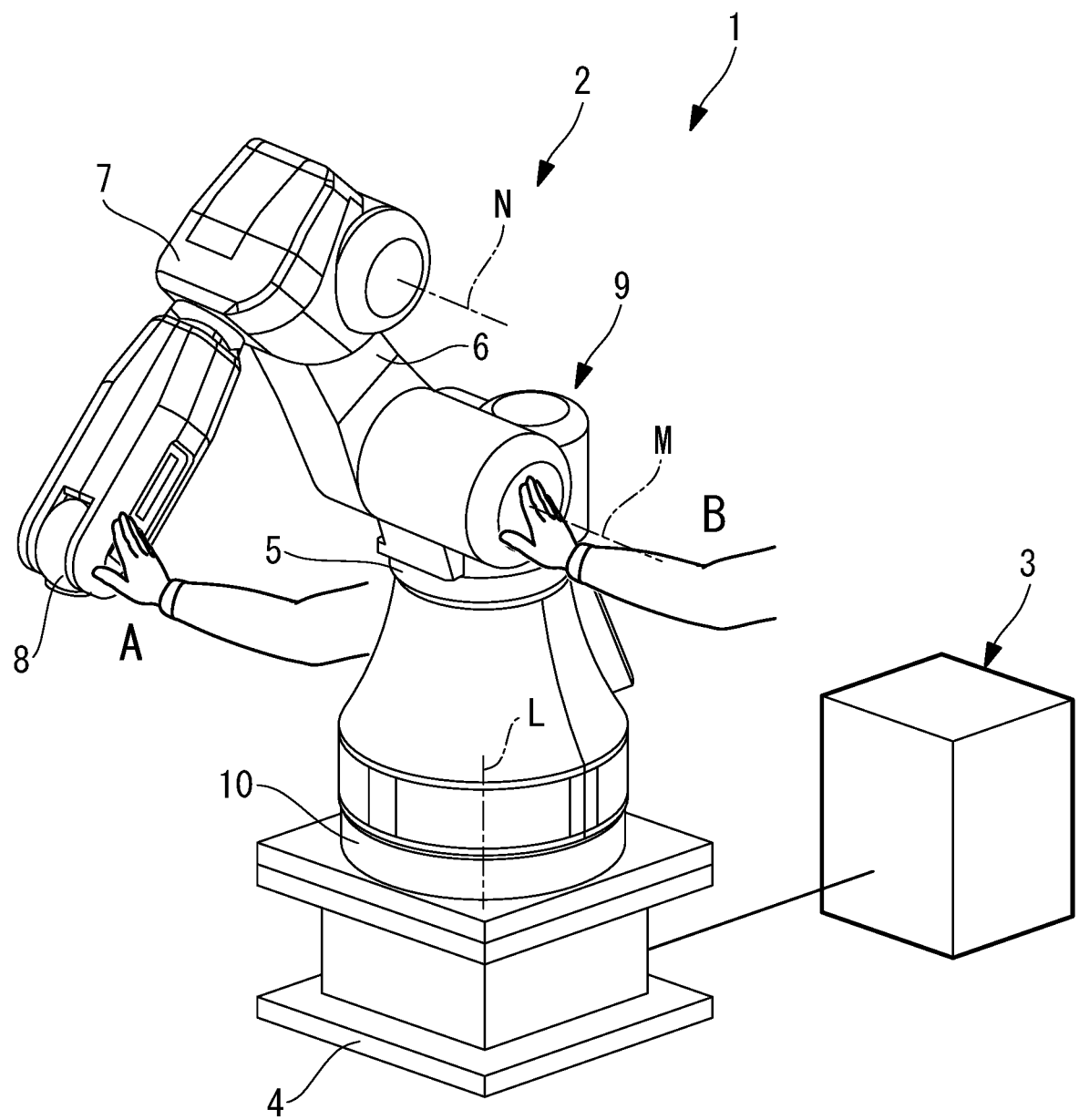
FIG. 1 illustrates the overall configuration of a robot system according to an embodiment of the present invention.

As shown in FIG. 1, the robot system 1 according to this embodiment includes a six-axis articulated robot 2 and a controller 3 that controls the robot 2.

The robot 2 includes a base 4 fixed to the floor surface, a rotating body 5 supported in a rotatable manner about a first axis L that is orthogonal to the base 4, a first arm 6 supported in a swivelable manner about a second axis M that is horizontal to the rotating body 5, a second arm 7 supported by the distal end of the first arm 6 in a swivelable manner about a third axis N that is parallel to the second axis M, and a wrist (wrist section) 8 provided at the distal end of the second arm 7. The base 4, the rotating body 5, the first arm 6, and the second arm 7 constitute a basic shaft unit 9 that determines the three-dimensional position of the wrist 8.

A six-axis force sensor (sensor) 10 that detects force and moment is disposed between the base 4 and the rotating body 5.

The controller 3 allows for selection of a lead-through teaching mode in which an operator manually moves the robot 2 by directly applying an external force thereto. In a case where the lead-through teaching mode is selected, the controller 3 sequentially stores positional information of each shaft of the robot 2 in accordance with a teaching operation at each position to which the shaft is manually moved, whereby an operational program can be readily taught.

In this case, in an initial state where the lead-through teaching mode is selected, an operation mode in which the shafts of the basic shaft unit 9 and the wrist 8 can be freely moved within a limited operating range is set in accordance with the magnitude and the direction of an external force applied by the operator.

Then, in a case where the six-axis force sensor 10 detects that the operator has applied an external force of a predetermined pattern to a predetermined position, the controller 3 changes the operation mode in accordance with the position and the pattern of the detected external force.

Specifically, an example of the predetermined pattern of the external force includes a double-tapping operation performed within a predetermined time period (e.g., 0.5 seconds to 1 second).

An example of the predetermined position of the external force includes a position near the wrist 8 of the robot 2 (i.e., reference sign A in FIG. 1) or a position near the basic shaft unit 9 of the robot 2 (i.e., reference sign B in FIG. 1), as shown in FIG. 1.

In this embodiment, if the six-axis force sensor 10 detects that the position A is double-tapped by the operator, the controller 3 allows the wrist 8 alone to be movable in the subsequent lead-through teaching process but maintains the remaining shafts (i.e., the basic shaft unit 9) in a fixed state.

If the six-axis force sensor 10 detects that the position B is double-tapped by the operator, the controller 3 maintains the orientation of the distal end of the wrist 8 (i.e., a tool attached to the distal end of the wrist 8) in a fixed state while allowing the remaining shafts to move.

Figure 2:
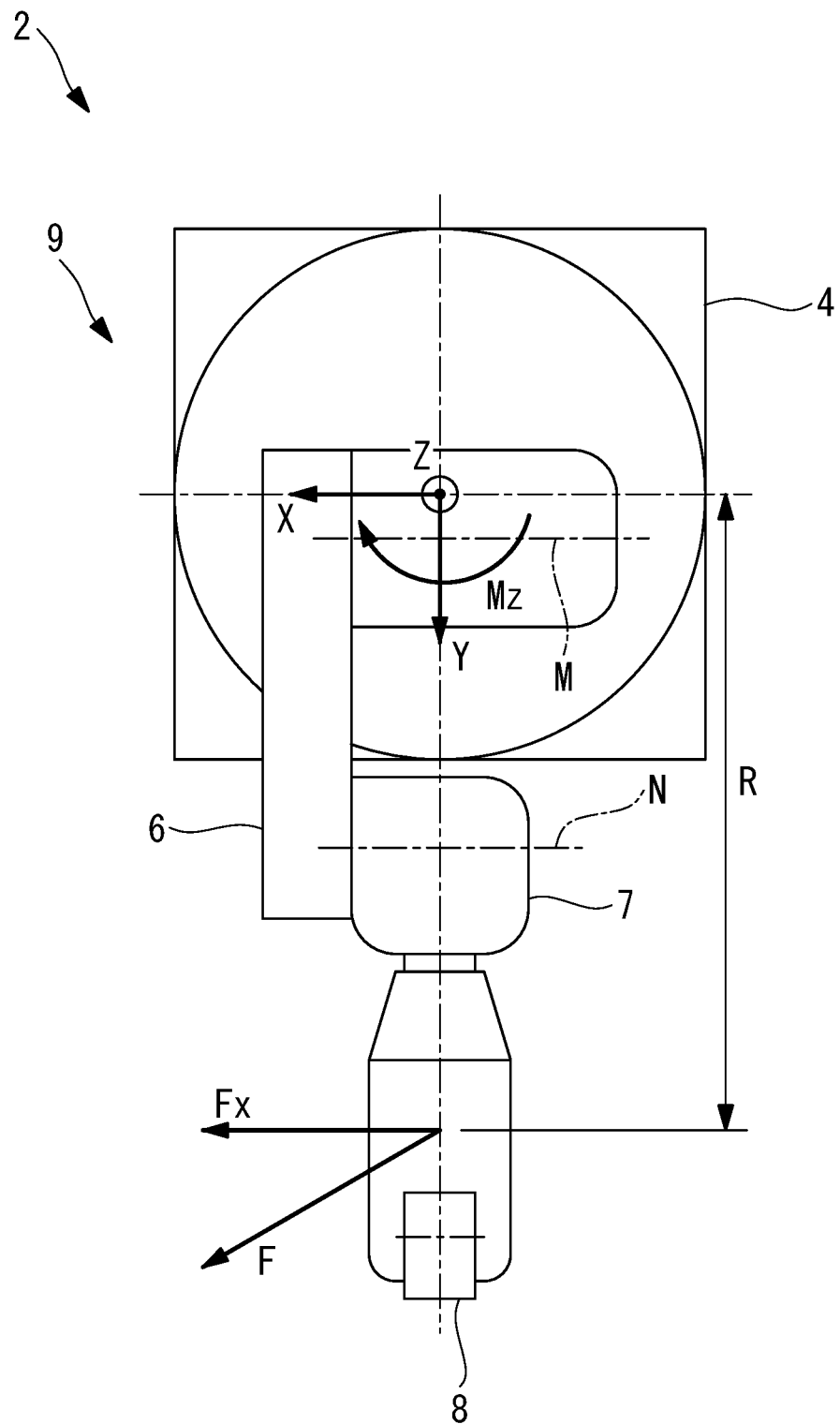
FIG. 2 is a plan view schematically illustrating the relationship between an external force applied to a robot of the robot system in FIG. 1 and the position thereof.

In the case where the six-axis force sensor 10 is used as a sensor, as described above, it is not possible to directly identify which position of the robot 2 has received an external force, but the position can be determined in accordance with the following calculation. First, referring to FIG. 2 illustrating a top view of the robot 2, when an external force F is applied, the six-axis force sensor 10 obtains an external force Fx in an X-axis direction.

Then, since a value obtained by dividing a moment Mz around the first axis L by the external force Fx (Mz/Fx) is equivalent to a distance R from the first axis L to a point of application of the external force F, the position of application of the external force F can be determined. In FIG. 2, the external force Fx is a force parallel to the plane of the drawing, and the moment Mz is a moment around the first axis L that is orthogonal to the plane of the drawing.

As a result of the above-described process, it can be distinguished whether the external force applied to the robot 2 by the operator is applied to the wrist 8 or to the basic shaft unit 9.

Therefore, in a case where the pattern of the external force detected by the six-axis force sensor 10 is a double-tapping operation and the position of the external force detected by the six-axis force sensor 10 corresponds to the wrist 8 (e.g., R>threshold value), the controller 3 changes the operation mode such that the basic shaft unit 9 is fixed and the wrist 8 alone is manually movable.

In contrast, in a case where the pattern of the external force detected by the six-axis force sensor 10 is a double-tapping operation and the position of the external force detected by the six-axis force sensor 10 corresponds to the basic shaft unit 9 (e.g., R≤threshold value), the operation mode is changed such that the orientation of the distal end of the wrist 8 is maintained in a fixed state while the basic shaft unit 9 is manually movable.

In a case where the pattern of the external force detected by the six-axis force sensor 10 is not a double-tapping operation, the shafts are moved in accordance with the external force without changing the operation mode.

Figure 3:
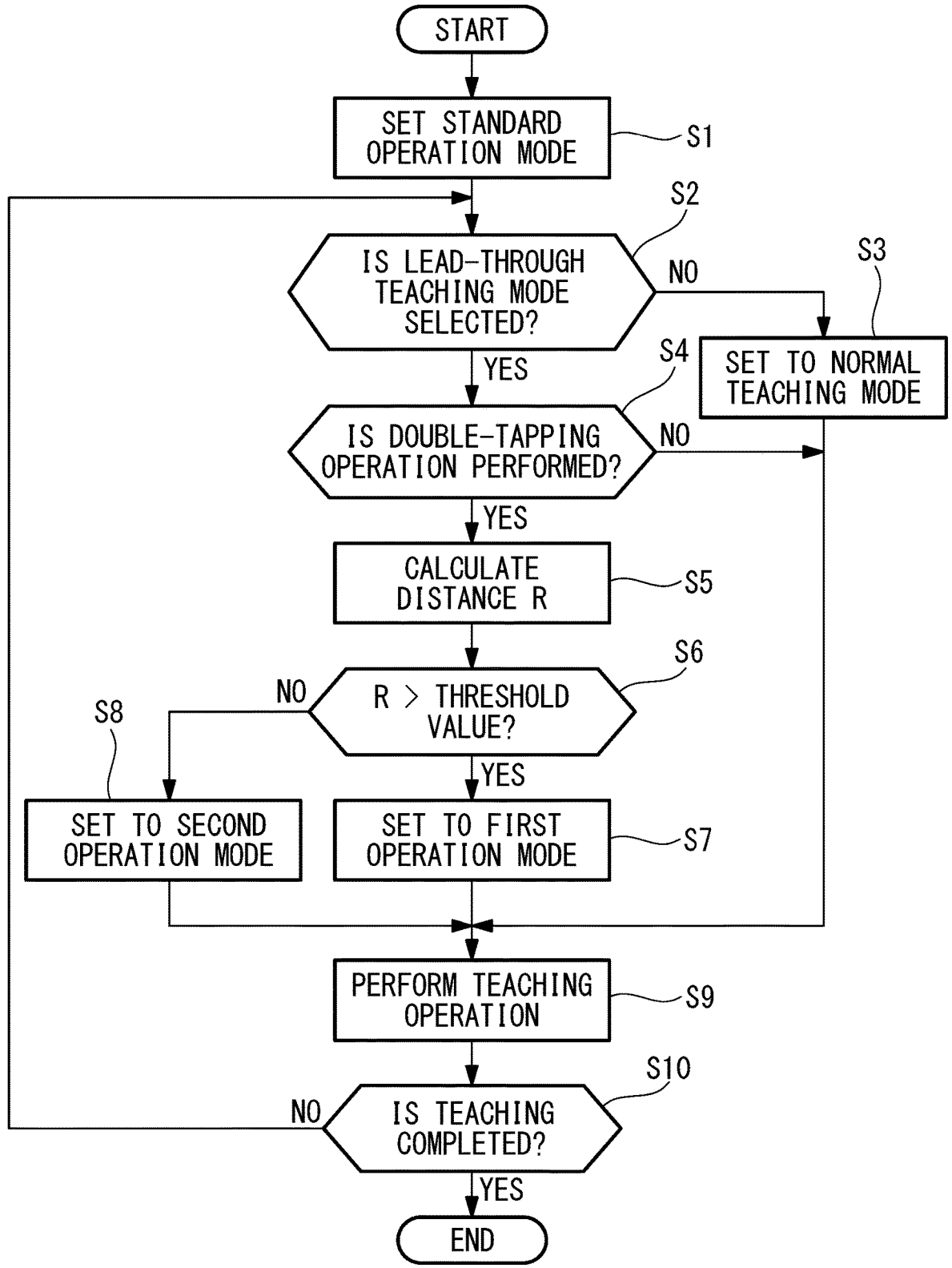
FIG. 3 is a flowchart illustrating a robot teaching method according to an embodiment of the present invention, which uses the robot system in FIG. 1.

The method of teaching the robot 2 using the robot system 1 according to this embodiment having the above-described configuration will be described below with reference to FIG. 3.

In the robot system 1 according to this embodiment, when teaching the operational program, an operation mode in which all of the shafts of the robot 2 are moved in accordance with a command (i.e., a standard operation mode) is set in the initial state (step S1). Then, it is determined whether or not the lead-through teaching mode is selected (step S2). If the lead-through teaching mode is not selected, a normal teaching mode that uses, for example, a teaching control panel (not shown) is set (step S3).

If the lead-through teaching mode is selected, the operator moves the robot 2 by directly applying an external force thereto, thereby moving the robot 2 to a desired teaching point.

In this state, it is determined whether or not the operator has double-tapped a predetermined position of the robot 2 (step S4). When the predetermined position is double-tapped, the distance R from the first axis L to the position to which the external force is applied is calculated based on the magnitude of the external force and the magnitude of the moment detected by the six-axis force sensor 10 (step S5), and it is determined whether or not the distance R is larger than a predetermined threshold value (step S6).

If the determination result indicates that the distance R is larger than the threshold value, the position to which the external force is applied is the wrist 8. Thus, the operation mode is changed to an operation mode (i.e., a first operation mode) in which the basic shaft unit 9 is fixed while the wrist 8 alone is moved in accordance with the external force (step S7). If the determination result indicates that the distance R is smaller than or equal to the threshold value, the position to which the external force is applied is the basic shaft unit 9. Thus, the operation mode is changed to an operation mode (i.e., a second operation mode) in which the orientation of the distal end of the wrist 8 is maintained in a fixed state while the remaining shafts are moved in accordance with the external force (step S8).

In this state, a teaching operation is performed (step S9), and it is sequentially determined whether or not the teaching is completed (step S10). If the teaching operation is not completed, the process from step S2 and onward is repeated.

The teaching operation is also performed (step S9) when the predetermined position is double-tapped in step S4 or when the normal teaching mode is set (step S3).

In the robot system 1 and the method of teaching the robot 2 according to this embodiment, in a case where an external force detected by the six-axis force sensor 10 is of a predetermined pattern, that is, a double-tapping operation in which an external force is applied twice within a predetermined time period, the external force of that pattern can be distinguished from an external force applied for moving the robot 2 in lead-through teaching and can be clearly recognized as being a command for changing the operation mode of the robot 2.

Because the operation mode is changed to a different operation mode in accordance with the position to which an external force is applied, the operation mode can be changed to an operation mode that is suitable for lead-through teaching, thereby achieving improved ease of teaching. In this case, if the operator double-taps the robot 2 near the wrist 8, the operation mode can be changed to an operation mode in which the basic shaft unit 9 is fixed and the wrist 8 alone moves freely in accordance with an external force. If the operator double-taps the robot 2 near the basic shaft unit 9, the operation mode can be changed to an operation mode in which the shafts are moved in a state where the orientation of the wrist 8 is fixed.

Specifically, the operation mode is changed as a result of detecting an external force applied to the robot 2 by using the six-axis force sensor 10 provided in the robot 2. This is advantageous in that special hardware (such as a switch) for changing the operation mode is not necessary. Moreover, the operation mode can be changed to an operation mode in which the wrist 8 alone is freely movable by simply double-tapping a position near the wrist 8. The operation mode can be changed to an operation mode in which the orientation of the distal end of the wrist 8 is fixed by simply double-tapping a position near the basic shaft unit 9. This is advantageous in that the operator can change the operation mode more intuitively.

In this embodiment, the operation mode is changed to an operation mode in which the wrist 8 alone is freely movable by double-tapping a position near the wrist 8, and the operation mode is changed to an operation mode in which the orientation of the distal end of the wrist 8 is fixed by double-tapping a position near the basic shaft unit 9. Alternatively, the operation mode may be changed to another operation mode.

For example, in a case of a world coordinate system in which the coordinate system set for lead-through teaching is fixed relative to the base 4 of the robot 2 or a workpiece coordinate system in which the coordinate system is fixed relative to a workpiece worked by the robot 2, the operation mode may be changed as described above, whereas, in a case of a tool coordinate system in which the coordinate system is fixed to a tool attached to the distal end of the wrist 8 of the robot 2, the operation mode may be changed as follows.

Specifically, in the case where the tool coordinate system is set, the operation mode may be changed to an operation mode in which the shafts are moved while the tool center point (TCP) is fixed by double-tapping a position near the wrist 8, and the operation mode may be changed to an operation mode in which the shafts are moved while the orientation of the tool (wrist section, not shown) is maintained in a fixed state by double-tapping a position near the basic shaft unit 9.

An example of a predetermined pattern of an external force described in this embodiment includes an external force applied twice, that is, a double-tapping operation, within a predetermined time period. Alternatively, the predetermined pattern of the external force may include a case where an external force is applied a freely-chosen number of times, such as two or more times. Moreover, a different operation mode may be selected based on the number of times an external force is applied within a predetermined time period.

Furthermore, examples of a position to which an external force is applied described in this embodiment include a position near the wrist 8 and a position near the basic shaft unit 9. Alternatively, another freely-chosen position may be used. Moreover, as the pattern of an external force for changing the operation mode, a case where an external force having a component in the X-axis direction is applied is described here. Alternatively, an external force having a component in another freely-chosen direction may be applied, or the operation mode to be changed may be varied in accordance with the direction of the external force.

In this embodiment, the six-axis force sensor 10 disposed between the base 4 and the rotating body 5 detects the external force in the three axial directions and the moment around the three axes L, M, and N. Alternatively, a torque sensor may be provided for each axis.

For example, when the operator double-taps the first arm 6, the torque sensor for the second axis M detects torque, but the torque sensor for the third axis N does not detect torque. When the operator double-taps the second arm 7, the torque sensor for the third axis N detects torque, but the torque sensor for the second axis M does not detect torque. Accordingly, the position to which an external force is applied can be detected based on a combination of outputs from the plurality of torque sensors.

As an alternative to the six-axis force sensor 10 or the torque sensors detecting the position of an external force, a contact sensor may be disposed on the surface of the robot 2 and may directly detect the position to which an external force is applied and the pattern of the external force.

The above description relates to an example where, when a double-tapping operation is performed, the operation mode of the robot 2 is changed in correspondence with the double-tapped position. Alternatively, after one operation mode is changed to another operation mode, the operation mode may be changed back to the previous operation mode if the same position is double-tapped. Moreover, three or more operation modes and the sequence thereof may be set in correspondence with the same position, such that every time the position is double-tapped, the operation mode is changed to another operation mode in accordance with the sequence.

From the above-described embodiments and modifications thereof, the following aspects of the invention are derived.

An aspect of the present invention provides a robot system including a robot including at least one sensor that detects an applied external force, and a controller that controls the robot. The controller changes an operation mode of the robot when performing lead-through teaching in accordance with a position and a pattern of the external force detected by the sensor.

According to this aspect, when performing lead-through teaching, if an operator applies an external force of a predetermined pattern to a predetermined position of the robot, the external force is detected by the sensor. The controller then changes the operation mode of the robot in accordance with the position and the pattern of the detected external force. Examples of the operation mode of the robot include an operation mode in which the wrist section alone is manually movable while the remaining shafts are fixed, and an operation mode in which the orientation of the distal end of the wrist section is maintained in a fixed state while the remaining shafts are all moved in conjunction with one another.

The operator applies an external force of a predetermined pattern so that an external force for changing the operation mode can be distinguished from an external force continuously applied during lead-through teaching for manually moving the robot. Moreover, by changing the operation mode in accordance with the position to which an external force is applied, the operation mode can be switched between a plurality of operation modes for moving the robot during lead-through teaching.

In the above aspect, the sensor may detect a magnitude of the external force applied to the robot and may also detect a moment around a predetermined axis. The controller may calculate a position to which the external force is applied based on the magnitude of the external force and the moment detected by the sensor.

Accordingly, the sensor detects the moment around the predetermined axis and the magnitude of the external force when the external force is applied, and the distance from the axis to the position to which the external force is applied can be readily calculated. Consequently, the position to which the external force is applied can be calculated with high accuracy, so that the operation mode can be changed with high accuracy.

In the above aspect, the pattern of the external force may be set in accordance with a predetermined number of contact operations performed within a predetermined time period.

Accordingly, since an external force is not applied multiple times within the predetermined time period when normal lead-through teaching is being performed, an external force for changing the operation mode can be clearly distinguished from an external force input during normal lead-through teaching.

In the above aspect, the robot may include a wrist section and a basic shaft unit that determines a three-dimensional position of the wrist section, and the operation mode of the robot may be changed in accordance with a case where the external force is applied to a position near the basic shaft unit and a case where the external force is applied to a position near the wrist section.

Accordingly, the operation mode to be changed can be varied depending on whether an external force is applied to a position near the wrist section or to a position near the basic shaft unit. As mentioned above, the operation mode is often separated into movement of the wrist section and movement of the remaining shafts. For example, when an external force is applied to a position near the wrist section, the wrist section is manually movable while the basic shaft unit is limited in movement. When an external force is applied to a position near the basic shaft unit, the basic shaft unit is manually movable while the wrist section is limited in movement. Thus, positions to which an external force is applied and the shaft or shafts to be moved during lead-through teaching are set in correspondence with each other, thereby allowing for a more intuitive operation.

In the above aspect, the controller may be capable of controlling the robot by changing a coordinate system and may vary the operation mode in accordance with the set coordinate system.

Accordingly, the operation mode can be varied depending on, for example, a coordinate system fixed relative to the robot or a coordinate system that moves together with the robot. For example, in the case of a tool coordinate system fixed to the distal end of the wrist section, the operation mode can be switched between an operation mode in which the tool center point is fixed while the remaining shafts are movable and an operation mode in which the orientation of the tool is fixed while the remaining shafts are movable.

In the above aspect, the sensor may be a contact sensor disposed on a surface of the robot.

Accordingly, the position and the pattern of the applied external force can be directly detected by the contact sensor, so that the operation mode can be readily changed.

Another aspect of the present invention provides a robot teaching method including detecting a position and a pattern of an external force applied to a robot, and changing an operation mode of the robot when performing lead-through teaching in accordance with the detected position and pattern of the external force.

The present invention is advantageous in that it can teach a robot by readily switching between various operation modes of the robot in lead-through teaching in which the robot is manually moved by directly applying an external force thereto.

REFERENCE SIGNS LIST 1 robot system
2 robot
3 controller
8 wrist (wrist section)
9 basic shaft unit
10 six-axis force sensor (sensor)
L first axis L

The invention claimed is:

1. A robot system comprising:
   a robot including at least one sensor that detects an applied external force; and
   a controller that controls the robot,
   wherein the controller is configured to determine a position to which the external force has been applied and a pattern with which the external force has been applied on a basis of the detected external force, and is configured to change one of a plurality of predetermined operation modes of the robot on a basis of the determined position and the determined pattern; and
   wherein the position of the external force is determined based on a moment around a first axis and at least one external force in a second axis perpendicular to the first axis when the external force is applied.

2. The robot system according to claim 1,
   wherein the sensor detects the magnitude of the applied external force applied to the robot and also detects the moment around the first axis, and
   wherein the determining of the position and the pattern comprises calculating the position to which the applied external force has been applied based on the magnitude of the applied external force and the moment detected by the sensor.

3. The robot system according to claim 1,
   wherein the pattern of the applied external force is set in accordance with a predetermined number of contact operations performed within a predetermined time period.

4. The robot system according to claim 1,
   wherein the robot includes a wrist section and a basic shaft unit that determines a three-dimensional position of the wrist section, and
   wherein the operation mode of the robot is changed in accordance with a case where the applied external force is applied to a position near the basic shaft unit and a case where the external force is applied to a position near the wrist section.

5. The robot system according to claim 1,
   wherein the controller is capable of controlling the robot by changing a coordinate system and varies the operation mode in accordance with the set coordinate system.

6. The robot system according to claim 1,
   wherein the sensor is a contact sensor disposed on a surface of the robot.

7. The robot system according to claim 1, wherein the position of the external force is determined by dividing the moment around the first axis by a magnitude of the external force.

8. A robot teaching method, comprising:
   detecting an external force applied to a robot;
   determining a position to which the external force has been applied and a pattern with which the external force has been applied on a basis of the detected external force; and
   changing one of a plurality of predetermined operation modes of the robot on a basis of the detected position and pattern of the external force,
   wherein the position of the external force is determined based on a moment around a first axis and at least one external force in a second axis perpendicular to the first axis when the external force is applied.

9. The robot system according to claim 8, wherein the position of the external force is determined by dividing the moment around the first axis by a magnitude of the external force.

10. A robot system comprising:
    a robot; and
    a controller that controls the robot,
    wherein the robot comprises:
       a basic shaft unit comprising a base fixed to a floor surface, a rotating body supported to rotate about a first axis that is orthogonal to the base, a first arm supported to swivel about a second axis that is horizontal to the rotating body, a second arm supported by a distal end of the first arm to swivel about a third axis that is parallel to the second axis;
       a wrist provided at a distal end of the second arm; and
       a sensor disposed between the rotating body and the base, the sensor detecting an applied external force, and
    wherein the controller is configured to:
       determine, on a basis of the detected external force, whether the external force has been applied with a predetermined pattern,
       calculate, on a basis of the applied external force and a moment around the first axis, a distance between the first axis and a point of application of the external force,
       determine whether the calculated distance exceeds a predetermined threshold,
       in response to the external force having been applied with the predetermined pattern and the distance exceeding the predetermined threshold, changing an operation mode such that only the wrist is manually moved, and
    in response to the external force having been applied with the predetermined pattern and the distance being equal to or less than the predetermined threshold, changing such that only the basic shaft unit is manually moved.

\* \* \* \* \*